United States Patent [19]

Kusano et al.

[11] Patent Number: 5,686,505
[45] Date of Patent: Nov. 11, 1997

[54] PROCESS AND APPARATUS FOR SURFACE TREATMENT OF UNVULCANIZED RUBBER SHEET

[75] Inventors: Yukihiro Kusano, Kokubunji; Mahito Fuji; Masato Yoshikawa, both of Kodaira; Kazuo Naito, Kawasaki; Fumihiro Matsuyama, Sayama; Yoshio Nohara, Kodaira; Setsuo Akiyama, Sagamihara, all of Japan

[73] Assignee: Bridgestone Corporation, Tokyo, Japan

[21] Appl. No.: 569,010

[22] Filed: Dec. 7, 1995

[30] Foreign Application Priority Data

Dec. 7, 1994 [JP] Japan .................................. 6-303993
Dec. 7, 1994 [JP] Japan .................................. 6-303994
Dec. 7, 1994 [JP] Japan .................................. 6-303995

[51] Int. Cl.$^6$ ...................................................... C08J 3/28
[52] U.S. Cl. .................. 522/157; 522/158; 522/159; 522/160; 522/71
[58] Field of Search ................................ 522/159, 158, 522/157, 914, 1, 71, 160

[56] References Cited

U.S. PATENT DOCUMENTS

| | | | |
|---|---|---|---|
| 3,650,669 | 3/1972 | Osborn et al. | 522/158 |
| 4,166,890 | 9/1979 | Fried et al. | 521/92 |
| 4,548,687 | 10/1985 | Kitamura et al. | 522/83 |
| 4,639,379 | 1/1987 | Asai et al. | 427/40 |

FOREIGN PATENT DOCUMENTS 56-11605  3/1981  Japan .

Primary Examiner—Susan W. Berman
Attorney, Agent, or Firm—Sughrue, Mion, Zinn, Macpeak & Seas, PLLC

[57] ABSTRACT

Only an outer surface of an unvulcanized rubber sheet is preliminarily crosslinked by irradiating an infrared ray or a far infrared ray to the unvulcanized rubber sheet prior to subsequent final vulcanization, whereby the occurrence of rubber spew and rubber flash is considerably suppressed at the vulcanization step.

5 Claims, 4 Drawing Sheets

Irradiation of infrared ray

Rotating direction

PROCESS AND APPARATUS FOR SURFACE TREATMENT OF UNVULCANIZED RUBBER SHEET

BACKGROUND OF THE INVENTION

1. Field of the Invention

This invention relates to a process and an apparatus for treating a surface of an unvulcanized rubber sheet. More particularly it relates to a process and an apparatus for treating only a surface of an unvulcanized rubber sheet to preliminarily crosslink only the outer surface portion of the sheet for controlling the occurrence of rubber flash or spew after the vulcanization or reducing contamination of a mold in the production of rubber articles such as pneumatic tires, rubber vibration isolators and the like.

2. Description of the Related Art

In the production of the pneumatic tire as a rubber article, various rubber compounded stocks are cut or piled one upon the other or joined to each other to form a green tire. Then, the green tire is placed in a vulcanizer and vulcanized at a high temperature under a high pressure for a given time while expanding a bladder or the like inside the green tire to from a tire product. When an ordinary mold is used in the vulcanizer, it is apt to be contaminated and hence a great quantity of labor and cost are taken in the cleaning of the mold. During vulcanization, if air existing between the green tire and a mold in the vulcanizer is not discharged into the outside, a bare spot is created on the surface of the tire product to render it a reject part. Particularly, the occurrence of a bare spot becomes conspicuous in high-performance tires having a tread pattern of complicated and irregular structure, which has recently and increasingly been required, and the like. For this end, the discharge of air to the outside is usually carried out by the following methods:

(a) formation of vent-holes in the mold;

(b) formation of a split mold or subdivision of split mold segment.

In the method (a), rubber spews are formed at positions corresponding to the vent-holes, while thin rubber flashes are formed between the split segments in the method (b), so that the trimming is carried out for removing the rubber spew or rubber flash. Particularly, there is a problem that a greater number of steps are required in the trimming operation for removing fine rubber flashes.

In order to control the rubber spew or rubber flash, therefore, it is attempted to hardly flow rubber by the following methods, which has also problems as mentioned below.

(i) Formation of hard rubber by increasing an amount of a filler such as carbon black or the like:

It is difficult to conduct the kneading operation, and also it is very difficult to put the increased amount of the filler into practical use considering the compounding amount required for tire performances and the like, so that the increase of the filler amount is lacking in serviceability.

(ii) Increase of vulcanizing rate:

Since the formation of rubber spew or rubber flash is based on the fluidity of rubber at the starting time of vulcanization, it is considered to increase the vulcanization rate of rubber contacting with the mold by increasing the amount of sulfur or the amount of vulcanization accelerator selected. However, the expected effect is not obtained, and also the so-called burning phenomenon is apt to be caused in the kneading, extrusion or rolling, so that it is very difficult to put the increase of vulcanization rate into practical use.

(iii) Use of curing agent for rubber:

It is considered to use the curing agent for hardening the unvulcanized rubber to prevent the deformation. However, curing is caused at the kneading step and subsequent processing step, which has a bad influence upon the tire performance, so that it is very difficult to put the curing agent into practical use.

(iv) Application of a crosslinking agent to rubber surface:

The surface of rubber can be hardened by applying the crosslinking agent to the rubber surface prior to the vulcanization. However, this method has problems that the number of steps increases and the material cost rises.

(v) Use of an electron beam irradiation as a preliminary vulcanization means:

JP-B-56-11605 proposes a method wherein carbon-carbon bond between rubber molecules is preliminarily cured by irradiation of an electron beam to prevent the occurrence of rubber spew or rubber flash.

Although irradiation by electron beam is effective for controlling the rubber spew or rubber flash, the apparatus becomes expensive and requires a large space, and also it is difficult to prevent the occurrence of X-rays. Furthermore, the rubber performance may be degraded by the irradiation of electron beam (particularly the wear resistance is lowered by 5–10%).

SUMMARY OF THE INVENTION

It is, therefore, an object of the invention to solve the aforementioned problems of the conventional techniques and to provide a process and an apparatus for treating a surface of an unvulcanized rubber sheet prior to vulcanization in order to control the occurrence of rubber spew or rubber flash and reduce the contamination of a mold in the vulcanization of the rubber sheet.

The inventors have made various studies for solving the above problems and found that the above object is achieved when only an outer surface of an unvulcanized rubber sheet after extrusion or green work and the like is preliminarily crosslinked by passing through a particular heating means radiating a far infrared ray or an infrared ray prior to the vulcanization of the unvulcanized rubber sheet and as a result the invention has been accomplished.

According to a first aspect of the invention, there is the provision of a process for treating a surface of an unvulcanized rubber sheet, which comprises irradiating an infrared ray or a far infrared ray to an outer surface of the unvulcanized rubber sheet to preliminarily crosslink only the outer surface of the sheet prior to vulcanization.

In a preferable embodiment of the first invention, the irradiation of the infrared ray or far infrared ray is carried out by adjusting an output of a heat source of 500°–6000° C. for the radiation of the infrared or far infrared ray to render an outer surface temperature of the unvulcanized rubber sheet into 200°–550° C. and then irradiating the infrared or far infrared ray for not more than 90 seconds.

In another preferable embodiment of the first invention, the outer surface temperature of the unvulcanized rubber sheet is 280°–480° C., more particularly 330°–430° C., and the irradiation time is not more than 20 seconds, more particularly less than 3 seconds.

In the other preferable embodiment of the first invention, the outer surface of the unvulcanized rubber sheet is crosslinked at only a thickness of 1–1000 μm.

According to a second aspect of the invention, there is the provision of an apparatus for treating a surface of an unvulcanized rubber sheet, comprising a heat source radiating an infrared ray or a far infrared ray, a permeation plate dispersing and permeating the infrared or far infrared ray, means for transporting an unvulcanized rubber sheet to be treated at a controllable transporting rate, means for controlling a surface temperature of the unvulcanized rubber sheet, and means for controlling interlock of the heat source and the transportation of the unvulcanized rubber sheet.

In a preferable embodiment of the second invention, the heat source is a heat source of 500°–6000° C., and the transporting means is a roller conveyor for transporting the unvulcanized rubber sheet to pass through the apparatus for not more than 90 seconds, the surface temperature controlling means is means for adjusting an output of the heat source so as to render the surface temperature into 200°–550° C. by means of a surface temperature monitor, and the interlocking means is means for stopping the transportation of the unvulcanized rubber sheet and at the same time shutting off the heat source.

In another preferable embodiment of the second invention, a reflecting mirror is disposed on the heat source.

In the other preferable embodiment of the second invention, a gas supply port is arranged at an end portion of the apparatus and a discharge port is arranged at the other end portion thereof.

DESCRIPTION OF THE PREFERRED EMBODIMENTS

Figure 1:
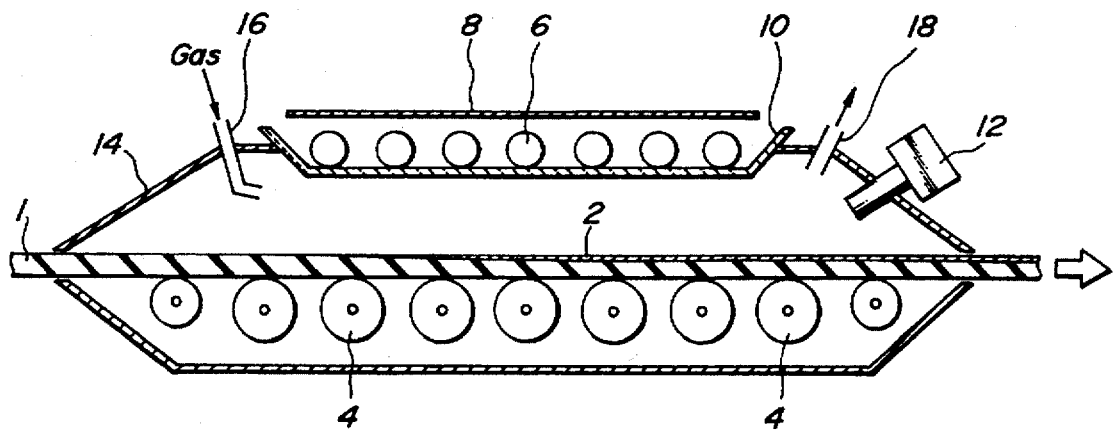
FIG. 1 is a diagrammatically sectional view of an apparatus for treating a surface of an unvulcanized rubber sheet according to the invention.

The term "unvulcanized rubber sheet" used herein means a compounded rubber stock after a rubber composition obtained by uniformly kneading a starting rubber, with given additives and filler in a kneader, is subjected to extrusion work, calender work or the like and before vulcanization. Particularly, the invention is applied to unvulcanized rubber sheets used for the vulcanization in a mold corresponding to a final product shape. For example, there are green sheets obtained by subjecting the compounded rubber stock to an extrusion work such as an unvulcanized tire tread material, green articles formed by cutting, laminating or joining the compounded rubber stocks into various shapes corresponding to final product shapes such as green bias or radial tires, and green rubber articles for use in rubber hoses, rubber vibration isolators and the like.

As the heat source radiating the infrared or far infrared ray, use may be made of general-purpose heaters such as a lamp heater using a halogen lamp or the like, ceramic heater, nichrome wire heater and so on. Moreover, the heater is favorable to be shut off in a moment when the transportation of the unvulcanized rubber sheet is stopped. The switching on and off of the heat source may be carried out by pulse control, if necessary. Preferably, a reflecting mirror formed by gold plating, silver plating, aluminum plating or the like and is arranged in the rear of the heat source to effectively supply heat energy generated from the heat source to the unvulcanized rubber sheet to be treated. The permeation plate is a window made from quartz glass or the like, which covers the heat source and fully permeates the infrared or far infrared ray to uniformize a temperature distribution inside the apparatus and prevents the contamination of the heat source. Moreover, the temperature of the heat source (color temperature in case of the halogen heater) is preferable to be in the range of 500°–6000° C.

According to the invention, the heat source is set above the unvulcanized rubber sheet to be treated at a distance of 0.1–100 cm separated from the outer surface of the sheet. Then, the infrared or far infrared ray generated from the heat source is irradiated to the unvulcanized rubber sheet for 0.05–90 seconds so that the surface temperature of the sheet is 200°–550° C. Preferably, the output of the heat source is adjusted to render the surface temperature into 280°–480° C. for the irradiation time of 0.1–10 seconds. When the surface temperature is lower than 200° C. and the irradiation time exceeds 90 seconds, it is difficult to preliminarily crosslink only the outer surface of the sheet and a greater part of the sheet is undesirably crosslinked. On the other hand, when the surface temperature exceeds 550° C., it is necessary to extremely shorten the irradiation time and it is considerably difficult to control the surface temperature. In case of the green sheet for a tire tread, it is desirable that the irradiation is conducted for less than 3 seconds to render the surface temperature into 330°–430° C. In the latter case, when the irradiation time exceeds 3 seconds, the rubber may be foamed to degrade the appearance of the tread.

When the surface of the unvulcanized rubber sheet is treated according to the method of the invention, the outer surface portion is crosslinked at only a thickness of 1–1000 μm. If the thickness exceeds 1000 μm, the crosslinking (vulcanization) of the outer surface is considerably promoted, so that it is difficult to obtain a desired shape at subsequent vulcanization and also there is a fear of causing a so-called bare spot.

In the apparatus according to the invention, the unvulcanized rubber sheet to be treated is usually transported by means of a roller conveyor. The transportation rate is dependent upon the kind of the sheet to be treated, performances required in the sheet or product, output of the heater and length of heating zone, but is within a range of 1 cm/min–400 m/min, preferably 1–100 m/min in order to smoothly operate the apparatus.

According to the invention, it is preferable that a gas supply port is arranged on an end portion of the apparatus and a discharge port is arranged on the other end portion thereof. As a gas to be supplied, use may be made of air, inert gas such as Ar, He, Xe or the like, nitrogen gas, oxygen gas, ozone and so on. When air is used, there may be caused the degradation of the sheet quality due to oxidation in the temperature rise. When using the inert gas or nitrogen gas, the oxidation reaction can be controlled. When using oxygen or ozone, the oxidation reaction may be promoted, but it is necessary to take a care in the handling of such a gas in view of safety. Moreover, the supply of the gas is effective to uniformize the temperature distribution inside the apparatus and remove contaminant substances produced from rubber or the like.

In the surface temperature control, infrared thermometers or thermocouples as a thermometer are placed in several positions to monitor the surface temperature of the unvulcanized rubber sheet to be treated. The measured data are fed back to a control unit (not shown) for controlling the output of the heat source, flow amount of gas and the like.

In the interlock control means, the power of the heat source is shut off in synchronism with an electric stop signal in the stop of the transportation.

The compounding recipe of the rubber composition for the formation of the unvulcanized rubber sheet used in the invention is not particularly restricted. That is, the rubber composition has various compounding recipes in accordance with the shape and use purpose of the final rubber article, but is usually comprised of synthetic rubber, natural rubber, carbon black, zinc white, stearic acid, antioxidant, vulcanization accelerator, sulfur, aromatic oil, spindle oil and the like.

In case of the unvulcanized rubber sheet for use in a tread of a pneumatic tire, the rubber composition comprises, for example, 85 parts by weight of carbon black, 20 parts by weight of oil, 3 parts by weight of ZnO, 1.5 parts by weight of sulfur, 1.2 parts by weight of vulcanization accelerator and 1.0 part by weight of antioxidant per 100 parts by weight of SBR as a starting rubber.

When the unvulcanized rubber sheet preliminarily treated at only the outer surface according to the invention is subjected to subsequent vulcanization for the formation of the final rubber article, the flow of rubber at the outer surface is suppressed rather than the flow of rubber inside the sheet at the start of the vulcanization, so that the occurrence of rubber spew or rubber flash in the vulcanization is controlled.

The following examples are given in illustration of the invention and are not intended as limitations thereof.

In the examples, a compounded rubber stock having the following compounding recipe is used as an unvulcanized rubber sheet for the formation of a tire tread:

| | |
|---|---|
| SBR | 100 (parts by weight) |
| Carbon black | 85 |
| Process oil | 20 |
| Zinc white | 3 |
| Sulfur | 1.5 |
| Vulcanization accelerator | 1.2 |
| Antioxidant | 1.0 |

EXAMPLE 1

In this example, an unvulcanized rubber sheet 1 (width: 300 mm, thickness: 10 mm) for tire tread obtained by extruding the above compounded rubber stock is subjected to a surface treatment by using an apparatus shown in FIG. 1.

Figure 2A:
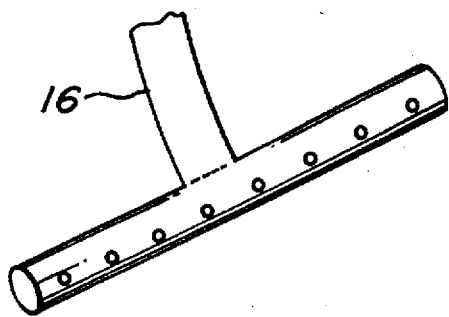
FIGS. 2a and 2b are perspective views illustrating embodiments of a gas supply port used in the apparatus according to the invention, respectively.
Figure 2B:
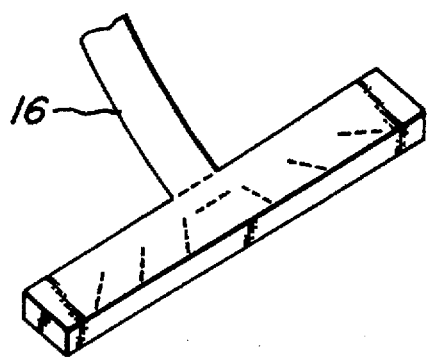

The unvulcanized rubber sheet 1 is transported at a transporting rate of 30 m/min through a roller conveyor 4 and is introduced into the apparatus comprising a halogen heater 6 having a heat source temperature of about 3000° C. (heating zone: width 0.2 m, length 1 m), a reflecting mirror 8 and a permeation plate 10, at where infrared ray generated from the halogen heater is irradiated to the outer surface of the sheet 1 for an irradiation time of 2 seconds. In this case, five infrared ray thermometers 12 are arranged in place to monitor a surface temperature of a treated outer surface portion 2, during which the monitored data are fed back to a control unit (not shown), whereby an output of the halogen heater 6 is adjusted to control the surface temperature to 300° C. These members are enclosed with a cover 14, while a nitrogen gas is blown from a gas supply port 16 (FIG. 2a) at a flow rate of 10 l/min and discharged from a discharge port 18.

In this way, only the outer surface of the unvulcanized rubber sheet 1 is preliminarily crosslinked by a thickness of about 100 μm, while the remaining portion of the sheet is still at an unvalcanized state.

EXAMPLE 2

Figure 3:
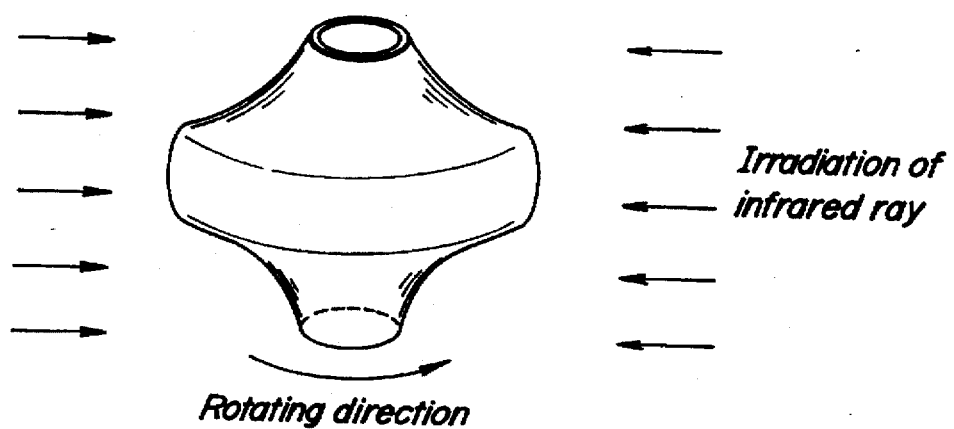
FIG. 3 is a diagrammatic view illustrating a surface treatment of a green tire.

The same unvulcanized rubber sheets as in Example 1 are cut, piled or joined to form a green tire 20 for the formation of a final tire product. As shown in FIG. 3, the green tire 20 is rotated and subjected to a surface treatment by an irradiating infrared ray generated from a halogen heater (use of 6 halogen lamps, heat source temperature: 3000° C.) under conditions that the surface temperature is 380° C. and the irradiation time is 2.5 seconds.

The thus surface-treated green tire is vulcanized in a vulcanizer according to the usual manner (vulcanizing conditions: 165° C., 10 minutes) to form a tire product. As a result, the occurrence of rubber spew or rubber flash is considerably decreased as compared with the case of using the vulcanized rubber sheet not subjected to the surface treatment.

EXAMPLE 3

An unvulcanized rubber sheet for use in a tire tread is prepared according to the same method as in Example 1 and then subjected to a surface treatment at a given surface temperature (250° C., 280° C., 380° C.) for a given irradiation time (1–4 seconds) by using a halogen heater.

Figure 4:
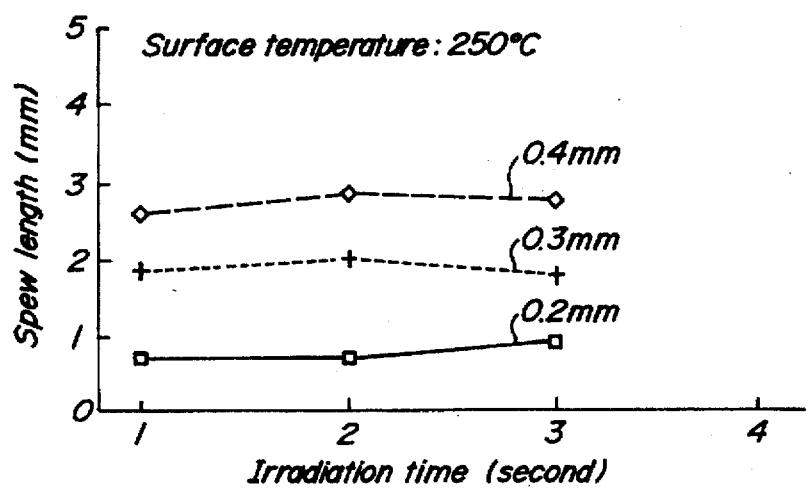
FIG. 4 is a graph showing a relation between irradiation time of a halogen heater and spew length at a surface treating temperature of 250° C.
Figure 5:
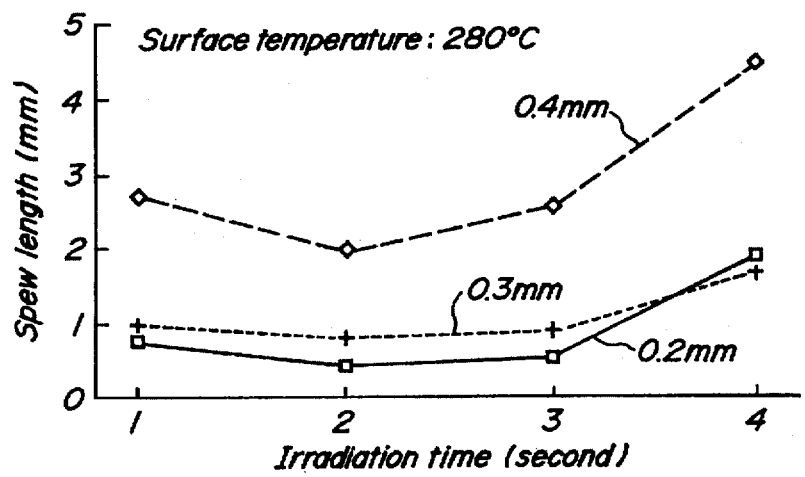
FIG. 5 is a graph showing a relation between irradiation time of a halogen heater and spew length at a surface treating temperature of 280° C.
Figure 6:
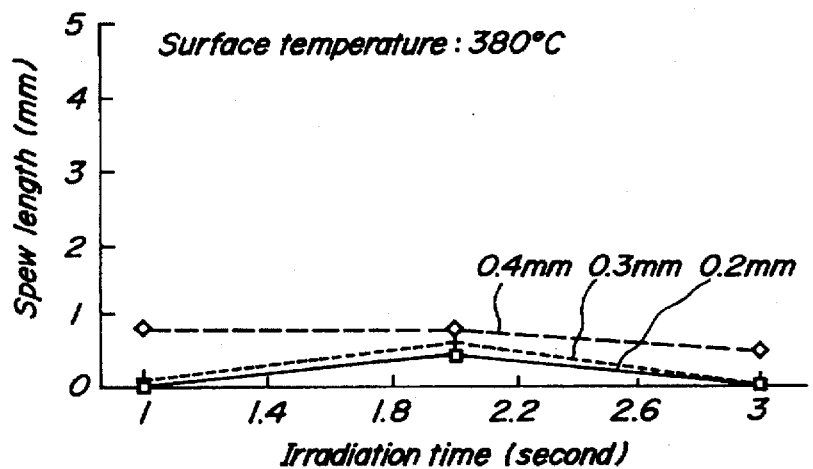
FIG. 6 is a graph showing a relation between irradiation time of a halogen heater and spew length at a surface treating temperature of 380° C.

The thus surface-treated sheet is placed in a mold having holes of a given diameter (0.2, 0.3, 0.4 mm) and then vulcanized at 165° C. and 20 kgf/cm² for 10 minutes and thereafter length of rubber spew formed on the surface of the vulcanized sheet is measured to obtain results as shown in FIGS. 4–6. The shorter the spew length, the better the crosslinking effect by the surface treatment.

FIG. 4 illustrates results at a surface temperature of 250° C., and FIG. 5 shows results at a surface temperature of 280° C., and FIG. 6 shows results at a surface temperature of 380° C.

As seen from the above results, when the surface temperature is 380° C. and the irradiation time is 2 seconds, the best results are obtained. However, when the unvulcanized rubber sheet is treated at a surface temperature of 380° C. for 3 seconds, bubbles are somewhat created on the surface and hence there is caused a problem in the surface appearance.

EXAMPLE 4

A slab sheet is prepared by sheeting the same compounded rubber stock as in Example 1 to a thickness of 2 mm. Then, the slab sheet is subjected to a surface treatment by irradiating infrared ray generated from a halogen heater (70 volts, 60 Hz), which is located at a distance separated apart from the sheet surface by 4 cm, for a given irradiation time (20, 40, 60 seconds).

The thus surface-treated slab sheet is vulcanized under conditions of 165° C., 20 kgf/cm² and 10 minutes, from which a JIS No. 3 dumbbell test specimen is punched out to measure strength at break (Tb) and elongation at break (Eb) according to a test method of JIS K6301.

Figure 7:
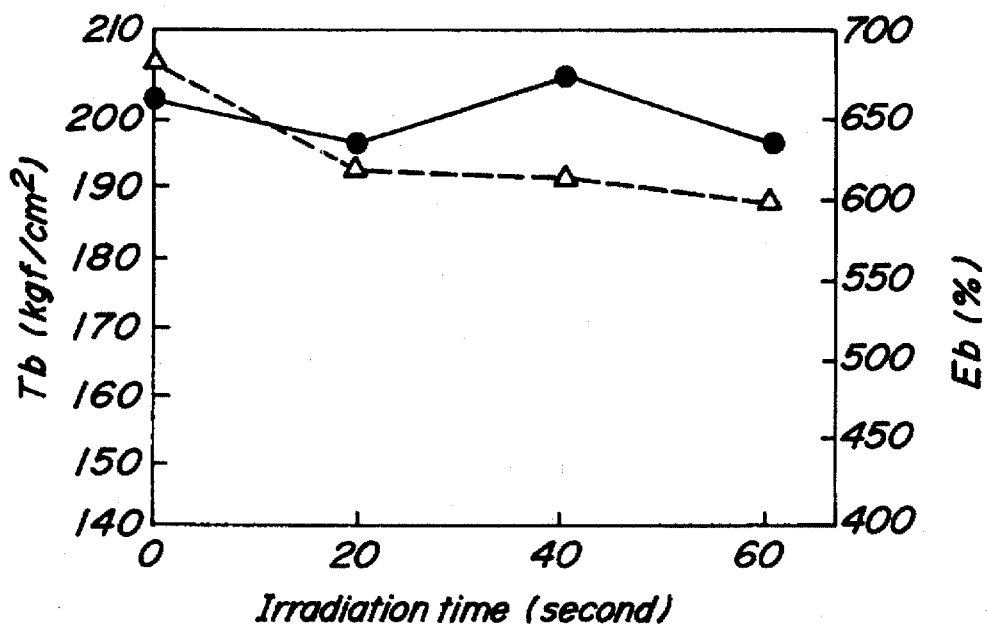
FIG. 7 is a graph showing a relation between irradiation time of a halogen heater and strength and elongation at break of tread rubber.

The measured results are illustrated in FIG. 7.

Comparative Example 1

The same slab sheet as in Example 4 is subjected to a surface treatment by irradiating electron beam (acceleration voltage: 200 keV, current: 10 mA) at a given irradiation quantity (20–400 Mrad). The thus surface-treated slab sheet is vulcanized under conditions of 165° C., 20 kgf/cm² and 10 minutes and then the strength at break (Tb) and elongation at break (Eb) are measured in the same manner as in Example 4. The measured results are shown in FIG. 8.

Figure 8:
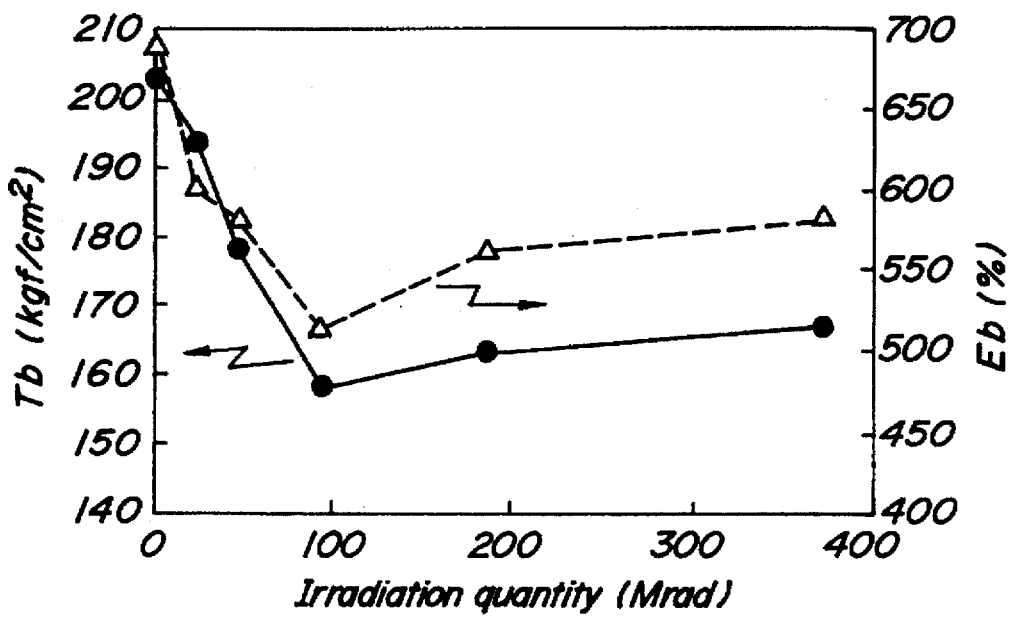
FIG. 8 is a graph showing a relation between irradiation quantity of an electron beam and strength and elongation at break of tread rubber.

As seen from FIG. 8, the properties are considerably lowered as the irradiation quantity is increased. Furthermore, fine cracks are created under tension of rubber when the irradiation quantity is not less than 40 Mrad.

As mentioned above, according to the invention, the occurrence of rubber flash or rubber spew is suppressed during the vulcanization in a mold for the production of rubber articles such as pneumatic tires, rubber vibration isolators and the like, and also the contamination of the mold is considerably mitigated. In case of a pneumatic tire, the trimming operation for the removal of rubber spew and flash after the vulcanization is considerably mitigated and the tire products having excellent appearance and quality are obtained and the tire productivity is improved. Also, the cleaning operation for the mold is mitigated. Further, the properties of the rubber article such as strength at break, elongation at break and the like are improved as compared with the conventionally known treatment with electron beam.

Moreover, the apparatus according to the invention can be manufactured simply and compactly and can easily be attached to the existing production line for the rubber articles. Further, it is not required to use an expensive apparatus and an X-ray shielding device as required in the irradiation of electron beam and the safety is very high.

What is claimed is:

1. A process for treating a surface of an unvulcanized rubber sheet, comprising the steps of: irradiating by an infrared ray or a far infrared ray an outer surface of the unvulcanized rubber sheet to preliminarily crosslink only the outer surface of the sheet prior to vulcanization and subsequently vulcanizing the rubber sheet, wherein control of an occurrence of rubber flash or spew after vulcanization is obtained.

2. A process according to claim 1, wherein the irradiation of the infrared ray or far infrared ray is carried out by adjusting an output of a heat source of 500°–6000° C. for the radiation of the infrared or far infrared ray so as to render an outer surface temperature of the unvulcanized rubber sheet into 200°–550° C. and then irradiating the infrared or far infrared ray for not more than 90 seconds.

3. A process according to claim 2, wherein the outer surface temperature of the unvulcanized rubber sheet is 280°–480° C., and the irradiation time is not more than 20 seconds.

4. A process according to claim 2, wherein the outer surface temperature of the unvulcanized rubber sheet is 330°–430° C., and the irradiation time is less than 3 seconds.

5. A process according to claim 1, wherein the outer surface of the unvulcanized rubber sheet is crosslinked at only a thickness of 1–1000 µm.

* * * * *